Nov. 25, 1924.

M. NAUDS ET AL 1,516,889

BY-PASS PREVENTER AND AUTOMATIC SHUT-OFF

Filed Aug. 18, 1923

WITNESSES

INVENTOR
MAX NAUDS
HARRY S. ROSS
BY
ATTORNEYS

Patented Nov. 25, 1924.

1,516,889

UNITED STATES PATENT OFFICE.

MAX NAUDS AND HARRY SEWARD ROSS, OF NEW YORK, N. Y.

BY-PASS PREVENTER AND AUTOMATIC SHUT-OFF.

Application filed August 18, 1923. Serial No. 658,135.

*To all whom it may concern:*

Be it known that we, MAX NAUDS and HARRY S. ROSS, both citizens of the United States, and residents of the city of New York, borough of Manhattan, in the county and State of New York, have invented a new and Improved By-Pass Preventer and Automatic Shut-Off, of which the following is a full, clear, and exact description.

This invention relates to an improved device for preventing by-passing gas meters and has for an object to provide a construction wherein the removal of the gas meter will automatically shut off the gas in such a manner that it cannot be again turned on without breaking the seal of the gas company.

Another object of the invention is to provide a device to be attached between a gas meter and the gas supply line therefor which will automatically operate for shutting off the gas whenever the gas meter is removed.

In the accompanying drawing—

Figure 1:
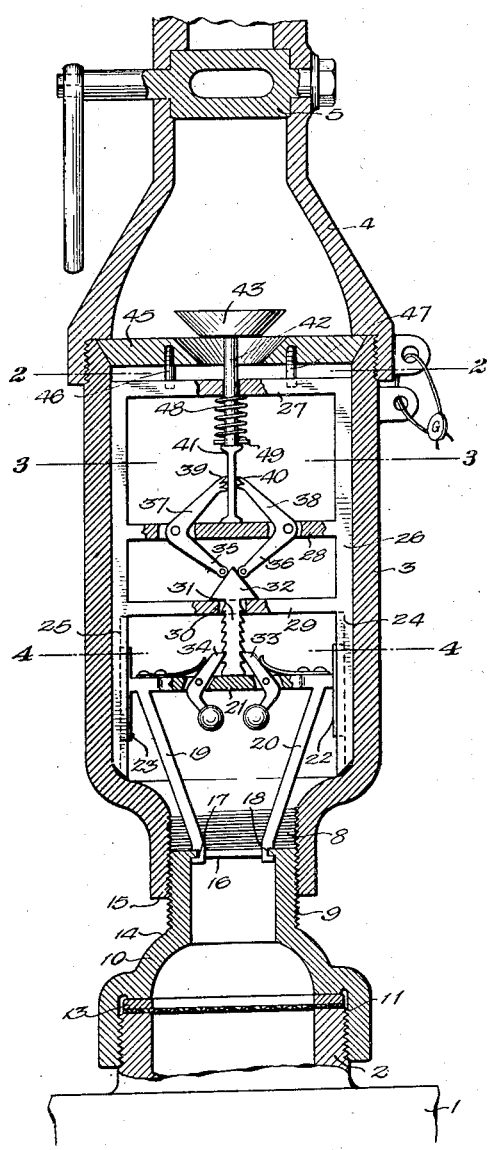
Figure 1 is a longitudinal vertical sectional view through a by-pass preventer and automatic shut-off, disclosing an embodiment of the invention.
Figure 2:
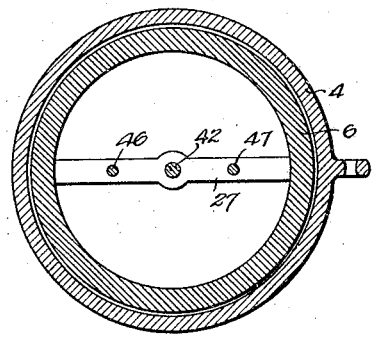
Figure 2 is a transverse sectional view through Figure 1, approximately on line 2—2.
Figure 3:
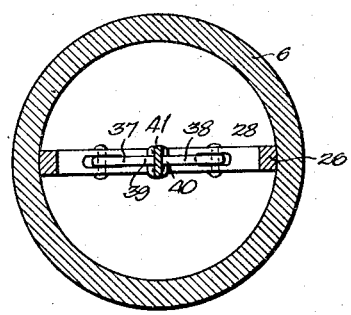
Figure 3 is a transverse sectional view through Figure 1, on line 3—3.
Figure 4:
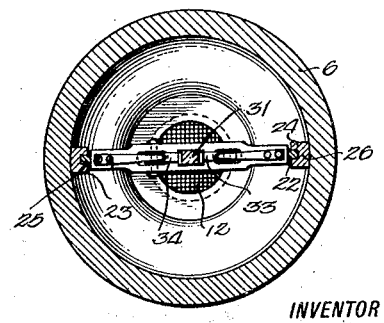
Figure 4 is a transverse sectional view through Figure 1, on line 4—4.

Referring to the accompanying drawing by numerals, 1 indicates a gas meter of the usual construction provided with a boss 2 having a right-hand thread in the usual manner. Instead of connecting the boss 2 through a suitable fitting to the gas main, a special automatic shut-off device 3 is provided which is screwed into the end of the fitting 4 carrying the usual manually actuated shut-off valve 5. The fitting 4 is threaded with a supply pipe in any desired manner and is sealed to the casing 6 of the device 3 by a suitable seal 7 applied by the gas company. The lower end of the casing 6 is provided with a left-hand thread 8 accommodating the left-hand threads 9 of the connecter 10, which connecter is provided with internal right-hand threads 11 for screwing onto the threaded boss 2. A wire mesh or perforated sheet metal diaphragm 12 is mounted on a ring 13 and is arranged in the connecter 10. The ring 13 is preferably soldered in place whereby the diaphragm 12 is permanently located and will permit gas to freely flow therethrough but will prevent an instrument from being inserted into the casing 6.

When the gas meter 1 is unscrewed, the section of the connecter 10 having the left-hand threads will screw into the threaded section 8 until the portion 14 of the connecter 10 will strike the end or shoulder 15 whereupon the movement will stop and any continued movement will cause the gas meter 1 to be unscrewed from the connecter. In order to accomplish this result, the threads 11 are adapted to fit rather snugly the threads on the boss 2 so that the left-hand threads will first function in order that the device may be operated as hereinafter fully described. The connecter 10 is provided with an annular flange 16 which fits into the notches 17 and 18 of the arms 19 and 20 whereby when the connecter is moved inwardly as just described, these arms will be raised and will in turn raise the cross bar 21, which cross bar is provided with guiding feet 22 and 23 fitted into grooves 24 and 25 in the upright frame 26. The frame at the top is provided with a transverse bar 27 and a short distance below the transverse bar 28. Approximately half way between the bar 28 and bar 21 is an additional transverse bar 29 having an aperture 30 for accommodating the shank 31 of the cone 32. The shank 31 is provided with teeth for accommodating the spring pressed pawls 33 and 34, which pawls are pivotally mounted in suitable notches in bar 21 and which normally engage the shank 31 so that whenever bar 21 is raised by the action of arms 19 and 20 and the connecter 10, shank 31 and cone 32 will be raised. Upon raising these members, cone 32 will engage the ends 35 and 36 of the levers 37 and 38 which are pivotally mounted in suitable apertures in bar 28. The lever 37 is provided with three teeth 39 while lever 38 is provided with two teeth 40 adapted to fit into the space between the teeth 39 when permitted. It will be evident that a greater or less number of teeth may be used without departing from the spirit of the invention, though the number specified has been found to be desirable.

These teeth normally rest against a supporting member 41 which may be glass or other fragile material capable of being broken when the cone spreads ends 35 and 36 and forces the teeth toward each other. Normally the member 41 engages and supports the stem 42 of the valve 43 so as to hold the same off of its seat 44. This seat is formed in a plate 45 pressed against the casing 6 by the fitting 4. Pins 46 and 47 are threaded into the plate 45 and extend into suitable apertures in the bar 27 whereby said bar is held against independent rotation. A spring 48 surrounds the stem 42 and presses against bar 27 and against the pin 49 whereby when the fragile member 41 is broken, spring 48 will quickly seat valve 43 and, consequently, shut off the flow of gas. This happens whenever the connecter 10 is screwed into the casing 6 and no gas can be secured until after the device 3 is removed and a new fragile member 41 placed in position. By this construction and arrangement, it will be impossible for unscrupulous persons to remove the gas meter and connect the main supply pipe to various gas using devices.

What we claim is:—

1. A device of the character described, comprising a casing adapted to be connected with a gas supply pipe, a connecter adapted to be threaded onto a gas meter, said connecter having a left-hand threaded tubular section, said casing having a left-hand tubular threaded section adapted to receive the left-hand threaded section of the connecter, a shut-off valve arranged in said casing, and means actuated by said connecter when the same is screwed into said casing for causing said valve to close and thereby shut off the flow of gas.

2. A device of the character described, comprising a casing, a plate mounted on one end of the casing having a valve seat, a valve adapted to be seated on said seat, a spring for tending to continually cause said valve to be seated, a fragile member normally preventing said spring from seating said valve, means for breaking said fragile member, a connecter threaded into said casing and adapted to cause said fragile member to be broken when screwed to a given position, said connecter being adapted to be screwed to said given position when the gas meter connected therewith is unscrewed therefrom.

3. A device of the character described, comprising a casing having an end plate arranged at one end formed with a valve opening, said casing being restricted and provided with an internally threaded tubular section at the opposite end, a connecter adapted to be threaded into said tubular section, a valve co-acting with said valve seat, a spring acting to move the valve against its seat, a fragile member for normally supporting the valve off its seat, breaking members for breaking said fragile member, means for actuating said breaking members, and arms connected with said means and with said connecter whereby when said connecter is screwed a predetermined distance in said tubular member, said breaking means will be actuated.

4. A device of the character described, comprising a casing, said casing being provided with an end having a valve seat, a valve co-acting with said seat, a spring acting to close said valve, a fragile member for normally holding said valve open, a pair of breaking members for breaking said fragile support, a cone for actuating said breaking members, a plurality of pawls for normally supporting said cone and for raising the cone for causing an actuation of said breaking members, a bar for supporting said pawls, a plurality of arms connected with said bar, and an adjuster screwed into said casing, said adjuster being formed with means interlocking with said arms for causing movement of said arms when the adjuster is screwed into the casing whereby said pawls will raise said cone and cause an actuation of said breaking members for releasing said valve.

MAX NAUDS.
HARRY SEWARD ROSS.